Nov. 27, 1962          D. L. POMMER          3,066,064

HEAT-SEALED EDGE JOINT AND METHOD

Filed June 3, 1960          2 Sheets-Sheet 1

INVENTOR.
DENNIS L. POMMER
BY
*Moore, White & Burd*
ATTORNEYS

Nov. 27, 1962  D. L. POMMER  3,066,064
HEAT-SEALED EDGE JOINT AND METHOD
Filed June 3, 1960  2 Sheets-Sheet 2

INVENTOR.
DENNIS L. POMMER
BY
ATTORNEYS

United States Patent Office 3,066,064
Patented Nov. 27, 1962

3,066,064
HEAT-SEALED EDGE JOINT AND METHOD
Dennis L. Pommer, Minneapolis, Minn., assignor to Bemis Bro. Bag Company, Minneapolis, Minn., a corporation of Missouri
Filed June 3, 1960, Ser. No. 33,799
10 Claims. (Cl. 156—306)

This invention relates to heat-sealed joint constructions and more particularly to heat-sealed edge joints for sealing the edges of manufactured articles made from thermoplastic resinous sheet and film and includes the method for making such seals. The term "edge joint" as used herein includes broadly a joint running along aligned superimposed edges of two or more layers of sheet material and is to be distinguished from other joints such as lap joints, and butt joints and the like.

In many cases there has been a great deal of difficulty in obtaining a strong heat-sealed joint between two or more layers of plastic film or sheet, and particularly in the case of polyolefin film, such as polyethylene and polypropylene. A suitable seal is one in which the strength of the seal is very nearly the same as that of the film itself. While seals of satisfactory strength have often been obtained with light gage film ranging from 1 to 3 mils, poor seal strength is encountered especially when the film is of a fairly heavy gage, such as from 5 to 15 mils in thickness.

After conducting a large number of tests wherein two sheets of 10 mil polyethylene film were sealed together using prior art joints of various types I have found that strength of the joints was in no case more than 75% of the film strength and in some cases ranged as low as 55% of the film strength, even though optimum sealing temperature, pressure and time were selected in each case. If the temperature is too low during sealing or the sealing time is too short, the seal will be imperfect and the joint will be weaker than the film surrounding it. The following discussion therefore assumes that the best temperature, pressure and sealing times are selected.

Previous methods of sealing plastic film relied on fusing two superimposed sheets together by heat, with or without pressure, in a single operation. One disadvantage of this method is that sealed area loses most of the molecular orientation and resulting strength that was achieved during extrusion. The object of most film extrusion processes is to orient molecules of the plastic film to bring about the best physical properties. In sealing the film, the greater part of the orientation is lost because the film is not subject to tension during cooling and, as a result, the material in the seal is weaker than the material of the film itself. This weakness can be demonstrated easily by conventional tensile testing methods. The second disadvantage of this method is that the thermoplastic material, when it is heated to fusion temperature, cannot support the pressure of the heated sealing surfaces without flowing and consequently thinning down to some extent.

Recently heavy gage polyolefin films have become very important in the industrial packaging field. One notable application for such film is in manufacturing heavy gage polyethylene shipping bags. These bags are air tight, water impervious, and can be stored out of doors and therefore perform better than most prior bags of conventional paper or textile construction, even though the latter may include several layers of material as well as various moisture barriers and coating. A problem which has limited the successful use of these polyethylene containers is that heretofore no satisfactory seal could be made in bottom and top of the bag. As a result, the film thickness of the bag had to be increased beyond that which was actually necessary solely to assure that the top and bottom seals would be sufficiently strong. This, of course, raised raw material and production costs. I have found, however, that through the use of my improved joint construction, it has been possible to increase the strength of the top and bottom seal of 10 mil polyethylene shipping sacks very greatly beyond that which was previously possible, always over 95% of the film strength.

Broadly stated, my improved heat sealed joint comprises a band of resinous material formed from the material from which the sealed sheets are made having a generally bulbous cross-sectional appearance, considerably thicker than the combined thickness of the layers of sealed film and having an increasing cross-sectional thickness toward the free edge thereof.

A preferred method of making the joint consists of first sealing superimposed layers of sheet material together with heat and pressure along a narrow band parallel to and spaced inwardly from the edges of the sheets to be sealed, the edges of the sheet material projecting outwardly from the seal comprising an extension of unsealed sheet material, and thereafter subjecting the seal to heat above the melting temperature thereof for a period of time less than that required to bring the entire exposed portions of said sheet material to the melting temperature thereof. By this means the extensions are caused to melt into a bead which is the greater thickness of said seal. The cross-sectional thickness of the seal is increased and the material from said extensions is formed into a bulbous mass on the free edge of said joint.

It is one object of this invention to provide an edge joint construction for thermoplastic resinous film and sheet which has satisfactory strength when used with heavy gages as well as light gage sheet material.

It is another object of this invention to provide an edge joint for thermoplastic resinous sheet ranging in thickness up to 15 mils which is at least 95% as strong as the film itself.

It is a further object of this invention to provide an improved heat sealed joint construction for heavy gage plastic bags.

It is a still further object of this invention to provide a rapid and economical method for forming strong seals in heavy gage resinous sheet material.

Other objects will become apparent as the description proceeds.

To the accomplishment of the foregoing and related ends, this invention then comprises the features hereinafter described and particularly pointed out in the claims, the following description setting forth in detail certain illustrative embodiments of the invention, these being, however, but a few of the various ways in which the principles of this invention may be employed.

The invention is illustrated by the drawings in which the same numerals refer to corresponding parts and in which.

Figure 1:
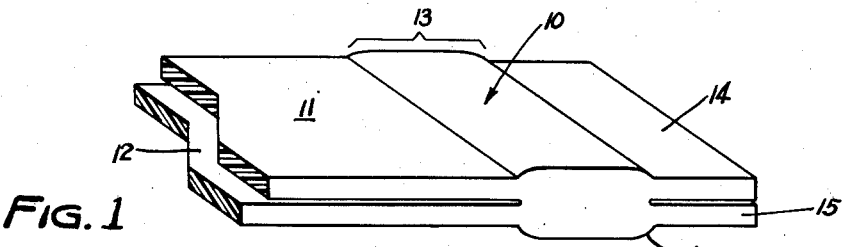
FIGURE 1 is a greatly enlarged perspective end view of two sheets of resinous plastic sheet material sealed together showing the first stage of forming seals according to this invention.

Referring now to the drawings, there is shown in FIGURE 1 a first stage seal joint 10 between two sheets of thermoplastic resinous film 11 and 12 made in the first stage of producing heat sealed joints according to this invention. The seal 10 comprises a band 13 somewhat thicker than the seal sheets formed from the resinous material of sheets 11 and 12 running parallel to the edges of the sheets and leaving unsealed bands or extensions 14 and 15 along the edges. The edges 16 of the band are generally rounded and the width of the band 13 is desirably between about 1/32 and 3/32 of an inch and preferably about 1/16 inch. The thickness of the band 13 is preferably about 1.5 times the combined thickness of the sheets 11 and 12 and is apparently continuous through the center where the two sheets are fused together. Extensions 14 and 15 of unsealed film projecting outwardly beyond the seal 10 are preferably about the same width as the width of the band 13.

Seal 10 is made without holding the film under tension. Thus, the sealed band 13 shrinks to about 2/3 the width of the heated sealing surfaces. Heated sealing surfaces are used to form seal 10 and are maintained at a temperature of from 250° F. to 500° F. depending upon the particular film being sealed. A preferred temperature range for 10 mil polyethylene film is about 285° F. and the preferred sealing time is about 2.5 seconds. The sealing pressure is preferably about 5 lbs. per square inch of seal area but this may be changed to suit the specific characteristics of the machine being used. Usually a higher sealing temperature is preferred because the productivity of the machine will be increased as a result.

Means are desirably provided for accurately controlling the pressure exerted by the sealing surfaces during sealing, because it can be shown that increasing the pressure reduces the sealing time required at a given temperature or for given clamping time and higher clamping pressure requires a lower operating temperature. If the sealing time is too short, of course, no sealing will take place and if it is excessive the compression of the film caused by the heated sealing surfaces cannot be regained by shrinkage. If the temperature is too low, either no sealing will take place or the sealing time will be too long so that production is reduced. If the temperature is too high, the resin may degrade. If the pressure is too low delamination may take place and if too high the seal may be thinned down excessively and hence weakened.

Figure 2:
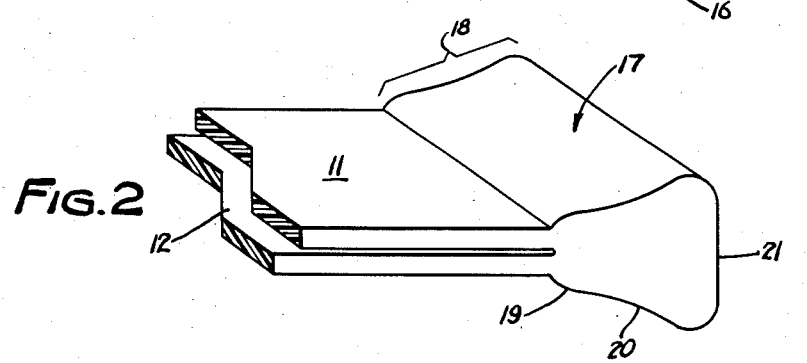
FIGURE 2 is a greatly enlarged perspective end view of two sheets of plastic material sealed together by means of the joint construction according to this invention.

The final joint construction indicated generally at 17 is illustrated in FIGURE 2. The joint consists of a bead or band 18 formed from the resinous material making up the sealed sheets 11 and 12 extending along the edge thereof and having a generally bulbous cross-sectional appearance. In the portion of the joint nearest the unsealed sheets 11 and 12 is an abrupt increase in cross-sectional thickness. This end of the seal is a rounded portion 19. The center portion 20 of the seal becomes gradually thicker in cross-section toward the free end of the joint and the edge portion 21 of the joint is generally rounded in cross-section and its thickness is preferably at least about two times the combined thickness of the sheets being sealed.

As noted hereinbefore, I have found that the prior art heat sealed joints formed from relatively heavy plastic film and sheet are considerably below the strength of the sheet material itself. The strength of seal 10 described above and illustrated in FIGURE 1 averaged about 65% to 75% of the seal strength. The strength of the finished joint illustrated in FIGURE 2, on the other hand, is at least 95% of the film strength.

Figure 1A:
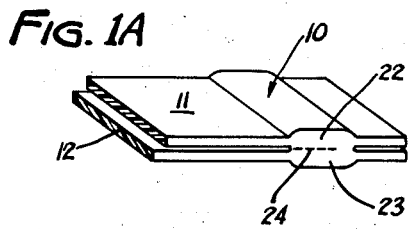
FIGURE 1A is a somewhat smaller perspective end view showing the normal rupture path of the sealed joint of FIGURE 1.

By examining the joint as the sheets 11 and 12 were pulled apart slowly, I found that the joint illustrated in FIGURE 1A would split into two sections designated 22 and 23 approximately along dotted line 24. Sections 22 and 23 of the joint on the opposite sides of the seal were found to stretch considerably as tension was increased, probably as a result of having become weakened through the loss of the molecular orientation during the sealing process. In almost every test, rupture took place in section 22 or 23. In some instances, however, the specimens split all the way through the center approximately where the two sheets had been sealed together originally.

Figure 2A:
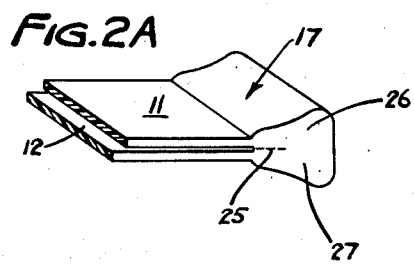
FIGURE 2A is a somewhat smaller perspective end view showing the normal rupture path of the sealed joint of FIGURE 2.

In the case of the joint construction according to this invention illustrated in FIGURE 2A, the same kind of splitting took place approximately along dotted line 25 but would never proceed past the center of the joint, probably because of the greater thickness of the large mass of material 21 at the outer edge of the joint. It was also found that sections 26 and 27 did not rupture. Instead, rupture took place in either sheet 11 or 12 at a short distance from the joint. This is the reason why the strength of the joint according to invention is always very nearly the same as the strength of the film itself.

Figure 4:
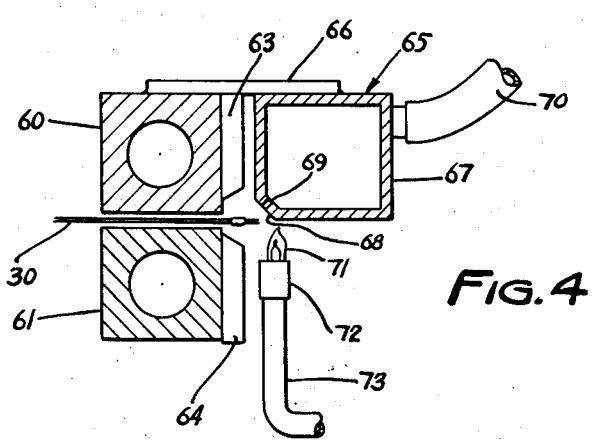
FIGURE 4 is a somewhat enlarged cross sectional side elevation of that portion of the sealing apparatus of FIG- URE 3 used to form the second sealing step in manufacturing seals according to this invention.
Figure 3:
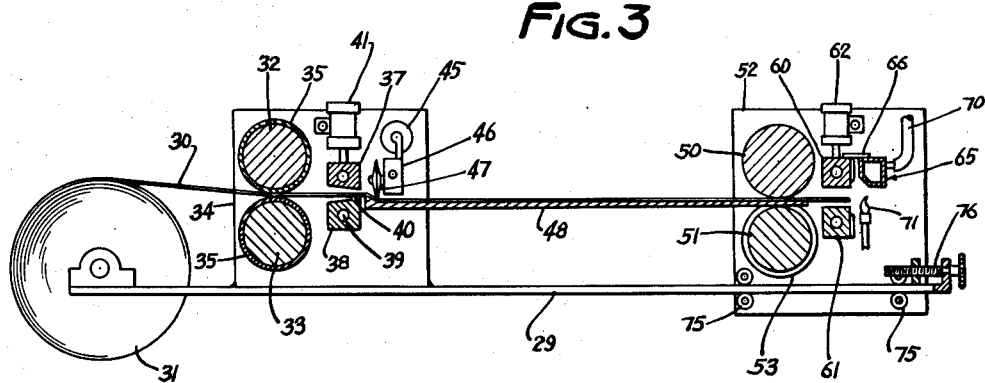
FIGURE 3 is a side elevation, in section, of one form of apparatus which may be used to manufacture plastic joints according to this invention.
Figure 5:
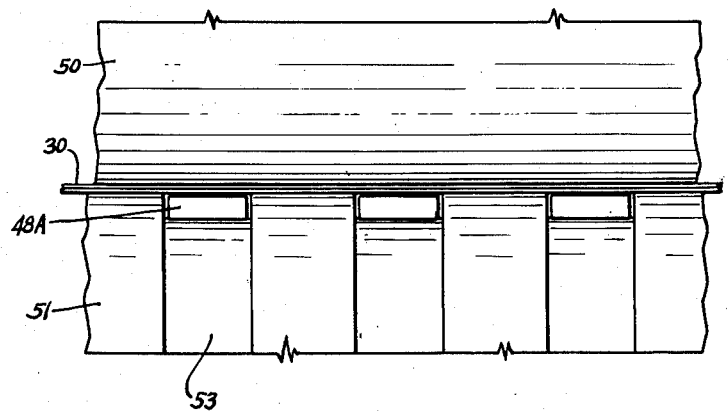
FIGURE 5 is a fragmentary end elevation showing the bite of the feed rolls to the second sealing stage of the apparatus.

Referring now to FIGURES 3, 4 and 5, there is shown one form of apparatus for producing heat-sealed joints according to this invention. The various parts of the apparatus are supported by a suitable frame including a plate 29. Plastic sheet material, such as tubing 30 which is to be made into bags, is withdrawn from a supply roll 31 by a pair of cooperating draw rolls 32 and 33 which are driven in a given feed direction by means not shown, and supported by metal uprights 34 at either end. The rolls are preferably covered by a coating 35 of resilient material such as rubber to assure that the film tubing 30 is gripped securely.

From the draw rolls 32 and 33 the tubing passes between a pair of heated bars 37 and 38. Heat is supplied by conventional electric heating elements 39 recessed within the bars. Each bar has a raised lip portion 40 running its length which is adapted to contact the tubing 30 when the bars 37 and 38 are forced together by a conventional commercial pneumatic actuator 41. The bars 37 and 38 form a seal joint similar to that illustrated in FIGURE 1. Downstream from the bars 37 and 38 is mounted horizontally a pneumatic actuator 45 which is used to move a cutting head 46 horizontally across the film. Rotatably attached to the cutting head 46 is a steel cutting wheel 47 having a sharp outer edge. Below the cutter is a flat metal plate 48 against which the cutting wheel 47 acts in severing tubing 30 adjacent to the seal 10 but spaced slightly from it to provide for unsealed bands 14 and 15.

After being severed by the cutting wheel 47, the sections of tubing pass over the plate 48 and between co-operating draw rolls 50 and 51 which are driven in given feed directions by means not shown and are supported by upright members 52 at either end. Roll 50 is preferably provided with a number of equally spaced grooves 53 about the circumference thereof, each having a flat bottom which may be an inch or two wide. Plate 48 is provided with an equal number of tongue like projections 48A which extend into grooves 53 between rolls 50 and 51. This provision assures that the plastic tube will be guided between rolls 50 and 51.

Downstream from rolls 50 and 51 are a pair of hollow bars 60 and 61 supported from uprights 52. A cooling medium such as water is passed through the center thereof to maintain the bars at an even temperature. The lower bar 61 is fixed to upright member 62 at either end and the upper bar 60 is free to move up and down in suitable guides. Up and down motion is imparted to bar 60 by means of pneumatic cylinder 62. Secured to one side of each bar are strips of asbestos 63 and 64 to protect the bars from heat produced by the gas burner 65 hereinbelow described.

Attached to the upper bar by a metal brace 66 is a gas burner 65 which comprises a square hollow tube 67 having a beveled corner 68 which is provided with a plurality of small holes 69 drilled through the wall thereof. A combustible gas such as butane, propane or natural gas is supplied to the burner 65 through tube 70. A pilot flame 71 is provided by a small burner 72. Gas is supplied to the burner 72 by pipe 73.

When the bars 60 and 61 are brought together on either side of the end of the plastic tube 30 close to seal joint 10, gas is introduced to burner 65 through tube 70. The flame of the burner is lighted by pilot flame 71 and the edge of the plastic tube 30 extending beyond the end of the seal 10 is melted into the greater thickness thereof to form a joint 17.

The entire station used to form the finished joint comprising upright members 52 and associated rolls 50 and 51, clamps 60 and 61, etc. is movably mounted on frame 29 by a number of small wheels 75. The position of the entire station with respect to the frame can be changed by adjusting set screw 76 so that the apparatus may be used for making bags of various lengths.

During operation, both pairs of draw rolls are rotated a predetermined number of turns and then stopped to advance any desired length of tubing. Heat sealing bar 37, clamp 60, gas burner 65 and the cutter 46 are then actuated simultaneously. The time and pressure required for sealing are controlled by adjustable commercially available regulators as is well known in the art. When the time required for sealing has elapsed, the sealing bars and clamps are separated and the gas is turned off. The first seal 10 and separation of the tubing for one bag will then be completed at the first station and the finished joint for another bag will be completed at the second station. Another section of tubing is advanced by again actuating both sets of rolls to begin another operating cycle, preliminary seal 10 made in the first station being formed into a finished joint at the second station. If the second sealing stage is operated alone without the first stage, that is, by sealing aligned edges which have undergone no previous sealing, the resulting joint is unsatisfactory in strength and usually exhibits occasional gaps or openings as a consequence of the two sheets melting away from one another when exposed to heat.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A method of joining together the edges of thermoplastic resinous sheet material which comprises first sealing together superimposed sheets by subjecting to heat and pressure over a narrow elongated area parallel to and spaced from the edges of the superimposed sheets to leave a narrow area of unsealed material adjacent the edges, and then melting said area of unsealed material between the sealed area and the edges of the sheets by application of heat to produce a thickened bead integral with said sealed area and of increasing thickness from said sealed area outward toward the free edges of the sheets.

2. A method according to claim 1 further characterized in that said thermoplastic resinous material is a polyolefin.

3. A method according to claim 2 further characterized in that said polyolefin is tubular polyethylene.

4. A method according to claim 3 further characterized in that said polyethylene has a thickness between about 5 and 15 mils.

5. A method according to claim 1 further characterized in that said sheet material adjacent to the sealed area but spaced away from the free edges of the sheets is artificially cooled during application of heat to the unsealed area between the sealed area and edges of the sheets.

6. A method according to claim 1 further characterized in that said heat for melting is applied by a plurality of gas jet flames.

7. A method of joining together the edges of thermoplastic resinous sheet material comprising first sealing superimposed layers of thermoplastic resinous sheet material together by heat and pressure along a narrow band parallel to and spaced inwardly from the edges of said sheets, the edges of the said sheet material projecting outwardly from said band comprising extensions of unsealed sheet material, and thereafter subjecting the seal to heat above the melting temperature thereof for a period of time less than that required to bring the entire exposed portion of said sheet material to the melting temperature thereof whereby said extensions are caused to melt into the greater thickness of said seal, the cross-sectional thickness of said seal is increased and the material of said extensions is formed into an integral bulbous mass along the free edge of said seal.

8. Apparatus for joining together the edges of thermoplastic resinous sheet material comprising means for intermittently advancing a plurality of superimposed layers of resinous sheet material; a first sealing station in the path of said advancing means, said station including a pair of sealing bars extending across the path of said advancing means, heating elements for heating said sealing bars, means for bringing said bars together on opposite sides of the advancing sheet material to apply pressure thereto; and a second sealing station in the path of said advancing means, said second station including a pair of clamping bars extending across the path of said advancing means, means for cooling said bars, means for bringing said bars together on opposite sides of the advancing sheet material to grip the same, and intermittent heating means extending across the path of said advancing means immediately adjacent one of said clamping bars to apply heat to one edge of said resinous sheet material extending out from said cooled clamping bars, said sealing bars, clamping bars and intermittent heating means being operable together between operations of said advancing means.

9. Apparatus according to claim 8 further characterized in that said intermittent heating means includes a tubular conduit extending across the path of said advancing means, a plurality of jet openings in said tubular conduit directed diagonally into the path of said advancing means, means for intermittently supplying a combustible gas to said conduit means and pilot means for igniting said gas.

10. Apparatus according to claim 8 further characterized by the provision of means adapted to hold a substantial supply of said resinous sheet material to be joined together in the form of a rolled web of substantial length, said supply means being disposed in the path of said advancing means, and means associated with said first sealing station to sever said web of resinous material into shorter lengths.

References Cited in the file of this patent

UNITED STATES PATENTS

| | | |
|---|---|---|
| 1,825,308 | Dorogi et al. | Sept. 29, 1931 |
| 2,488,212 | Lloyd | Nov. 15, 1949 |
| 2,679,469 | Bedford | May 25, 1954 |
| 2,682,910 | Piazze | July 6, 1954 |
| 2,744,844 | Wood | May 8, 1956 |
| 2,786,511 | Reid | Mar. 26, 1957 |
| 2,979,113 | Stageberg | Apr. 11, 1961 |
| 2,987,107 | Sylvester | June 6, 1961 |
| 2,994,361 | Gable | Aug. 1, 1961 |

FOREIGN PATENTS

| | | |
|---|---|---|
| 544,710 | Canada | Aug. 13, 1957 |